United States Patent [19]

Roberts et al.

[11] Patent Number: 5,227,217
[45] Date of Patent: Jul. 13, 1993

[54] COMPOSITE EDGE GUARD AND METHOD FOR MANUFACTURING SAME

[75] Inventors: Edward A. Roberts, Mt. Clemens; Barry D. Jorgensen, Detroit, both of Mich.

[73] Assignee: Color Customs, Inc., Warren, Mich.

[21] Appl. No.: 708,677

[22] Filed: May 31, 1991

[51] Int. Cl.$^5$ .............................................. B60R 13/06
[52] U.S. Cl. ..................................... 428/122; 49/462; 49/506; 428/358
[58] Field of Search .................. 428/122, 358; 49/462, 49/506

[56] References Cited

U.S. PATENT DOCUMENTS

| | | | |
|---|---|---|---|
| 2,910,033 | 10/1959 | Weisburg | 428/31 X |
| 3,385,001 | 5/1968 | Bordner | 428/122 X |
| 4,232,081 | 11/1980 | Pullan | 428/122 X |
| 4,281,045 | 7/1981 | Sumi et al. | 428/523 X |
| 4,581,807 | 4/1986 | Adell | 428/122 X |
| 4,902,549 | 2/1990 | Bright et al. | 428/122 |

*Primary Examiner*—Henry F. Epstein
*Attorney, Agent, or Firm*—Brooks & Kushman

[57] ABSTRACT

Disclosed is a removable edge guard for installation on an edge of a vehicle door or the like. The edge guard is a composite of self-supporting polymeric materials. A protector portion is formed from a first polymeric material and has a bumper section and a planar section. A base portion is formed from a second polymeric material more rigid than the first polymeric material. The base portion and the planar section of the protector portion together define a U-shaped channel to receive the edge of the vehicle door or the like. The base portion is extrudably joined to the planar section of the protector portion at the closed end of the U-shaped channel. A retention fin is extrudably joined to the base portion at the open end of the U-shaped channel. The retention fin is formed from the first polymeric material. The retention fin projects into the U-shaped channel toward the planar section of the protector portion. The retention fin and planar section cooperate to retain the edge of the vehicle door or the like received in the U-shaped channel. Also disclosed is a method of manufacturing the removable edge guard by co-extruding a first and second polymeric material through a single extrusion die to form a composite polymeric extrudent having the desired profile. The desired profile is maintained by a series of vacuum sizing plates until a memory is established by cooling the composite polymeric extrudent in a combination water bath and water wash. The composite polymeric extrudent is then cut into predetermined lengths to form the final composite polymeric edge guard.

9 Claims, 1 Drawing Sheet

COMPOSITE EDGE GUARD AND METHOD FOR MANUFACTURING SAME

TECHNICAL FIELD

This invention relates generally to protective guards for surface edges and their methods of manufacture. Specifically, this invention relates to an edge guard for removable installation on the edge of a vehicle door or the like and a method for manufacturing same.

BACKGROUND

It is becoming increasingly time consuming and expensive to repair even minor damage to the exterior body of automotive vehicles. As a result, both manufacturers and consumers are interested in protecting automotive vehicles from all types of such damage. This includes even minor dents or abrasions to the edges of vehicle doors, hoods, or trunks which can occur during shipment or day to day use of the vehicles.

A variety of devices have been developed for permanent installation on the edge of vehicle doors or the like. These devices generally comprise a deformable metal carrier coated with rubber or plastic materials as in U.S. Pat. No. 4,581,807 to Adell. These devices generally have a U-shaped cross section for receiving the edge of the vehicle door. The metal carrier is generally deformed so that the device resiliently grips the edge of the vehicle door.

These prior art devices are generally designed with metal carriers so that they may be permanently affixed to the edge of the vehicle door. They are designed for permanent installation because they are generally used as decorative trim or for installation of weather stripping around the edge of the vehicle door as in U.S. Pat. No. 4,232,081 to Pullan and U.S. Pat. No. 4,902,549 to Bright et al. Once installed, these devices are difficult to remove without marring the edge of the vehicle door. Moreover, when used as decorative trim or for installation of weather stripping, these devices generally must be of sufficient length to cover the entire edge of the vehicle door.

The prior art devices are often produced by a method wherein a rubber or plastic material is extruded upon the surface of a metal carrier as in U.S. Pat. No. 4,581,807 to Adell. This method, however, requires the additional step of pre-forming a deformable metal carrier to maintain the desired shape of the device as well as allow the device to adequately grip the edge of the vehicle door or the like. The metal carrier necessary in the methods for producing these prior art devices is primarily responsible for the marring of the edge of the vehicle door or the like.

The ideal edge protector for a vehicle door or the like is one that provides maximum protection at strategic locations. The ideal edge protector for a vehicle door or the like also overcomes the problems associated with metal carriers. It is capable of being temporarily installed and removed without marring the edge of the vehicle door.

The ideal method for producing the ideal edge protector eliminates the step of pre-forming a deformable metal carrier by utilizing self-supporting polymeric materials. The ideal method also eliminates the step of pre-forming a deformable metal carrier by utilizing a series of vacuum sizing plates and temperature control.

SUMMARY OF THE INVENTION

According to the present invention, an edge guard for protection of a vehicle door or the like is disclosed. The edge guard is a composite of self-supporting polymeric materials and is designed for removable installation on the edge of the vehicle door. The edge guard comprises a protector portion extending along the length of the edge guard and having a bumper section and a planar section. The protector portion is formed from a first polymeric material. The edge guard also comprises a base portion formed from a second polymeric material more rigid than the first polymeric material. The base portion extends along the length of the edge guard and is extrudably joined to the planar section of the protector portion. The base portion and the planar section of the protector portion together define a U-shaped channel for receiving the edge of the vehicle door. The composite edge guard also comprises a retention fin formed of the first polymeric material and extending along the length of the edge protector. The retention fin is extrudably joined to the base portion at the open end of the U-shaped channel. The retention fin projects into the U-shaped channel toward the planar section of the protector portion. The retention fin and the planar section of the protector portion cooperate to engage the vehicle door received in the U-shaped channel. The first polymeric material used to form the planar section of the protector portion and the retention fin is sufficiently resilient or elastic so that the edge of the vehicle door is not marred during installation or removal of the edge guard.

According to an alternative embodiment of the present invention, the planar section of the protector portion of the edge guard is provided with a plurality of ribs. The ribs extend along the length of the edge guard and project into the U-shaped channel formed by the base portion and the planar section of the protector portion. The ribs act in cooperation with the retention fin to flexibly and resiliently grip the edge of the vehicle door or the like received into the U-shaped channel.

A method for making a self-supporting composite polymeric edge guard is also disclosed according to the present invention. The method comprises co-extruding a high density polymeric material and a low density polymeric material through a single extrusion die to form a composite polymeric extrudent having a desired profile. The desired profile of said composite polymeric extrudent is then maintained until a memory is established by cooling the composite polymeric extrudent in a combination water bath and water wash. The composite polymeric extrudent is then cut into predetermined lengths to form the final composite polymeric edge guard.

Accordingly, it is a general object of this invention to prevent damage to the edge of a vehicle door or the like occurring during shipment or day to day use of the vehicle. Another object of this invention is to provide an improved protective device that is easily installed upon the edge of a vehicle door and maintains its proper position but is also removable therefrom without damaging the edge of the vehicle door. Another object of this invention is to provide a protective device that is compatible with a wider variety of edges of vehicle doors or the like.

Another object of this invention is to provide a protective device that is smaller and more flexible for easy storage in a wide variety of places.

Another object of this invention is to provide a protective device that is simple in design, inexpensive to manufacture and durable in construction.

A more specific object of this invention is a composite edge guard of self supporting polymeric material comprising a protector portion, a base portion and a retention fin wherein the protector portion and the base portion are extrudably joined to form a U-shaped channel configured to removably receive the edge of a vehicle door and the retention fin is extrudably joined to the base portion to act in cooperation with the protector portion for retaining engagement of the edge of the vehicle door.

Another more specific object of this invention is a method of making a self-supporting composite polymeric edge guard comprising the steps of co-extruding a high density and a low density polymeric material through a single extrusion die to form a composite polymeric extrudent having a desired profile, maintaining the desired profile of the composite polymeric extrudent until a memory is established, cooling the composite polymeric extrudent to establish a memory and cutting the composite polymeric extrudent into predetermined lengths to form the final composite polymeric edge guard.

These and other objects and advantages will be apparent after consideration of the following detailed description and drawings.

DETAILED DESCRIPTION OF THE DRAWINGS

Figures 1, 2:
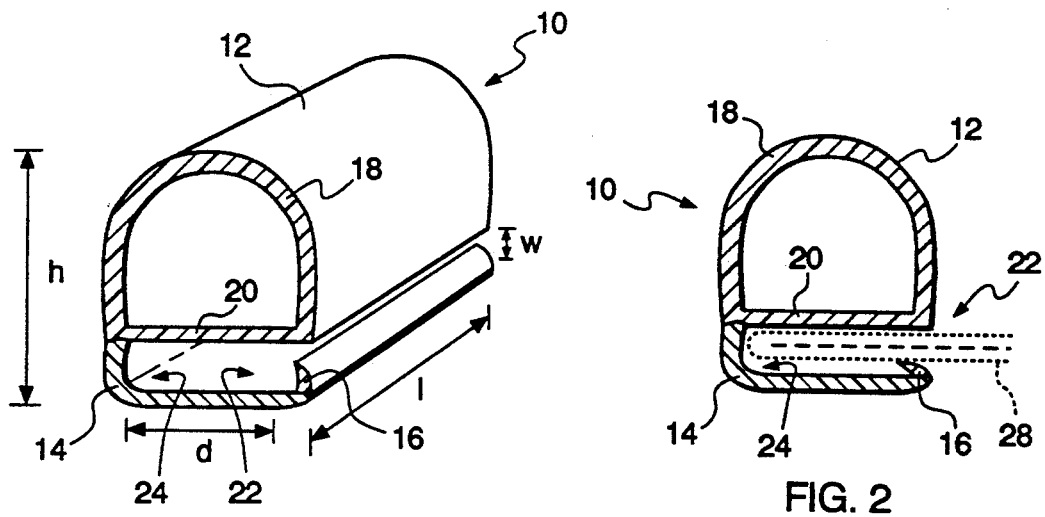
FIG. 1 is a fragmentary perspective view of the composite edge guard of the present invention.
FIG. 2 is a cross-sectional view of the composite edge guard of the present invention when installed on the edge of a vehicle door or the like, shown in phantom.

Referring now to FIGS. 1-4, the composite edge guard 10 of the present invention is pictured. The edge guard 10 comprises a protector portion 12, a base portion 14 and at least one retention fin 16. The protector portion 12, base portion 14 and retention fin 16 each extend along the length of the composite edge guard 10.

The protector portion 12 has a generally D-shaped cross-section formed by a semi-cylindrical bumper section 18 and a planar section 20. The planar section 20 has a pair of oppositely spaced sides where it is joined to the bumper section 18.

The base portion 14, together with the planar section 20 of the protector portion 12, form a generally U-shaped channel having an open end 22 and a closed end 24. The base portion 14 is extrudably joined to one side of the planar section 20 to form the closed end 24 of the U-shaped channel.

The retention fin 16 is extrudably joined to the base portion 14 at the open end 22 of the generally U-shaped channel. The retention fin 16 projects into the generally U-shaped channel toward the planar section 20 of the protector portion 12.

The protector portion 12 and the retention fin 16 are formed from a low density polymeric material, while the base portion 14 is formed from a high density polymeric material. A variety of polymeric materials may be used including polyurethane, polytherephthlate, polyvinylchloride and polyethylene. The preferred embodiment of the edge guard 10 is formed from polyethylene, which provides the least marring to the edge of the vehicle door or the like during installation and removal of the edge guard 10.

The low density polyethylene of the protector portion 12 and the retention fin 16 has a 70-75 durometer hardness and is more flexible and resilient than the high density polyethylene of the base portion 14, which has a 85-90 durometer hardness. As shown in FIG. 2, the rigidity of the high density polyethylene allows the base portion 14 to retain its form while the flexibility of the low density polyethylene allows the retention fin 16 to resiliently deformed when the edge 28 of a vehicle door or the like is received in the generally U-shaped channel formed by the planar section 20 and the base portion 14. The flexibility of the retention fin 16 as well as the rigidity of the base portion 14 is sufficient to grippingly engage the edge 28 of the vehicle door or the like against the planar section 20 of the bumper portion 12. The low density polyethylene forming the retention fin 16 and the planar section 20 also prevents marring of the surface of the vehicle door or the like during installation and removal of the composite edge guard 10.

Figures 3, 4:
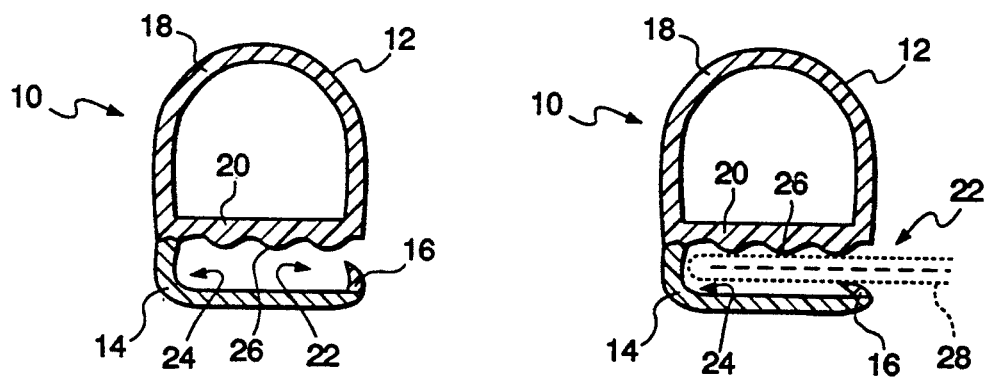
FIG. 3 is a cross-sectional view of an alternative embodiment of the composite edge guard of the present invention.
FIG. 4 is a cross-sectional view of an alternative embodiment of the composite edge guard of the present invention when installed on the edge of a vehicle door or the like, shown in phantom.

In an alternative embodiment of the present invention shown in FIGS. 3 and 4, the planar section 20 has a plurality of ribs 26 extending along the length of the composite edge guard 10. The ribs 26 cooperate with the retention fin 16 to grippingly engage the edge of a vehicle door or the like received into the generally U-shaped channel formed by the planar section 20 of the protector portion 12 and the base portion 14. FIG. 4 shows the deformation of the ribs 26 and the retention fin 16 when the edge 28 of a vehicle door or the like is received within the generally U-shaped channel formed by the planar section 20 and the base portion 14.

The relative dimensions of the edge guard 10 are first determined by the size of the extrusion die chosen. Additionally, vacuum sizing plates further determine the final dimensions, excluding overall length, of the edge guard 10. In the preferred embodiment, the edge guard 10 has a height, h, of 0.80-0.90 inches. The U-shaped channel has a depth, d, of 0.55-0.65 inches. The open end 22 of the U-shaped channel has a width, w, of 0.03-0.05 inches. The edge guard has an overall length, 1, of 3.75-4.25 inches. By placing the edge guard 10 at strategic locations along the edge of a vehicle door or the like, such a length is sufficient to provide adequate protection to the edge of a vehicle door or the like.

Figure 5:
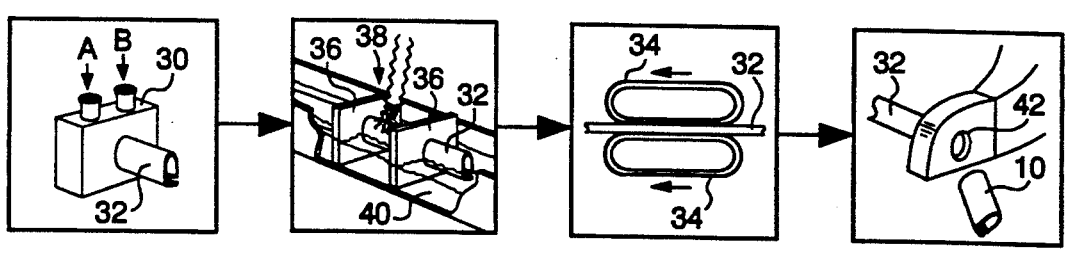
FIG. 5 is a schematic diagram of the method of making a composite polymeric edge guard of the present invention.

Referring now to FIG. 5, a method for making a composite polymeric edge guard 10 is depicted schematically. The method comprises the steps of coextruding high density A and low density B polymeric materials through a single extrusion die 30 to form a composite polymeric extrudent 32 having a desired profile, maintaining the desired profile of the composite polymeric extrudent 32 until a memory is established, cooling the composite polymeric extrudent 32 to establish such a memory and cutting the composite polymeric extrudent 32 into predetermined lengths to form the final composite polymeric edge guard 10. In the preferred embodiment, the high density A and low density B polymeric materials are polyethylene.

The co-extruding step of the method includes selecting a single extrusion die 30 having a desired profile of the final composite polymeric edge guard 10. The high density polyethylene A is heated to a temperature of 375° F. The low density polyethylene B is heated to a temperature of 275° F. The extrusion die 30 is maintained at a temperature of 282° F. Both the high density A and low density B polyethylene are then extruded through different portions of the die 30 to form a composite polymeric extrudent 32 of the desired profile. The use of high density A and low density B polyethylene provide the composite polymeric extrudent 32 with portions having differing resilience.

The maintaining step of the method includes utilizing a pair of oppositely spaced endless belts 34 to pull the composite polymeric extrudent at a rate of approximately 1.2 inches/second through a series of at least three vacuum sizing plates 36. The profile of each vacuum sizing plate 36 gradually decreases in size until the composite polymeric extrudent 32 is brought to the dimensions of the final composite polymeric edge guard 10. The first vacuum sizing plate 36 is approximately 10% larger than the final dimensions of the edge guard 10. The second vacuum sizing 36 plate is approximately 5% larger than the final dimensions of the edge guard 10. The last vacuum sizing plate 36 exactly matches the final dimensions of the edge guard 10. The vacuum sizing plates 36 function to properly size the composite polymeric extrudent 32 and to prevent the extrudent 32 from collapsing until it is cooled to form the final composite polymeric edge guard 10.

The cooling step of the method includes a combination water wash and water bath. The protector portion 12 and retention fin 16 of the composite polymeric edge guard 10 formed from low density polyethylene B are washed for a period of 1.5-2.5 seconds in a water stream 38 after exiting each vacuum sizing plate 36. The base portion 14 of the composite polymeric edge guard 10 formed from high density polyethylene A is submerged in a water bath 40 subsequent to each vacuum sizing plate 36. The high density polyethylene of the base portion 14 of the edge guard 10 is submerged for a total time of approximately 1.5 minutes. As a result, the low density polyethylene B is cooled slowly to help establish the flexibility and resilience necessary for the protector portion 12 and retention fin 16 to prevent marring to the edge of a vehicle door or the like. Additionally, the high density polyethylene is cooled quickly to help establish the rigidity necessary in the base portion 14 of the composite polymeric edge guard 10.

The method for making a composite polymeric edge guard 10 also comprises the step of cutting 42 the cooled composite polymeric extrudent into predetermined lengths to create a final composite polymeric edge guard 10. The composite polymeric edge guard 10 may then be used for removable installation on an edge of a vehicle door or the like.

It is to be understood that the embodiments of this invention as shown and described are preferred examples and that the invention is not to limited to the exact arrangements shows in the accompanying drawings or described in the specifications. Various changes in the details of the construction and shape of the elements of the preferred embodiment may be made without departing from the spirit of the invention. The scope of the novel concepts of the invention are defined in the following claims.

What is claimed is:

1. A composite edge guard of self-supporting polymeric material for removable installation on an edge of a vehicle door, said edge guard comprising:
   a protector portion of a first polymeric material extending along the length of said guard and having a bumper section and a planar section, said planar section having a pair of oppositely spaced sides;
   a base portion of a second polymeric material more rigid than said first polymeric material extending along the length of said guard and defining with said planar section a U-shaped channel configured to removably receive the edge of the vehicle door, said U-shaped channel having an open end and a closed end; and
   at least one retention fin of the same polymeric material as said protector portion;
   said base portion being extrudably joined to said protector portion along one side of said planar section at the closed end of said U-shaped channel, said retention fin being extrudably joined to said base portion at the open end of said U-shaped channel and projecting into said U-shaped channel toward said planar section and acting in cooperation therewith for retaining engagement of the vehicle door received in said U-shaped channel, said first polymeric material being sufficiently resilient so that the edge of the vehicle door is not marred during installation and removal of said edge guard.

2. The composite edge guard of claim 1 wherein said planar section has a plurality of ribs extending along the length of said guard and projecting into said U-shaped channel.

3. The composite edge guard of claim 1 wherein said retention fin extends along the length of said guard.

4. The composite edge guard of claim 1 wherein said first polymeric material is a low density polyethylene.

5. The composite edge guard of claim 1 wherein said second polymeric material is a high density polyethylene.

6. A method of making a self-supporting composite polymeric edge guard having a memory, said method comprising the steps of:
   co-extruding at elevated temperature a high density polymeric material and a low density polymeric material through different portions of a single extrusion die to form a composite polymeric extrudent of a desired profile having portions of differing resilience;
   maintaining said desired profile of said composite polymeric extrudent until a memory of said desired profile is established;
   cooling said composite polymeric extrudent to establish a rigid memory in said high density polymeric material and an elastic memory in said low density polymeric material; and
   cutting said composite polymeric extrudent into predetermined lengths to form said composite polymeric edge guard.

7. The method of claim 6 wherein the maintaining step includes oppositely spaced endless belt means for pulling the extrudent through a plurality of vacuum sizing plates.

8. The method of claim 6 wherein the cooling step includes washing said low density polymeric material in a water stream and submerging said high density polymeric material in a water bath.

9. The method of claim 6 wherein said high density polymeric material and said low density polymeric material are polyethylene.

* * * * *

UNITED STATES PATENT AND TRADEMARK OFFICE
Certificate

Patent No. 5,227,217                                                 Patented: July 13, 1993

On petition requesting issuance of a certificate for correction of inventorship pursuant to 35 U.S.C. § 256, it has been found that the above-identified patent, through error and without any deceptive intent, improperly sets forth the inventorship.

Accordingly, it is hereby certified that the correct inventorship of this patent is: Edward Albert Roberts, Barry Daniel Jorgensen and Frederick E. Schwab.

Signed and Sealed this Fifth Day of September, 1995.

ELLIS P. ROBINSON
*Supervisory Patent Examiner*
*Art Unit 1508*